United States Patent [19]

Beijer

[11] Patent Number: 4,487,440
[45] Date of Patent: Dec. 11, 1984

[54] AIRCRAFT DOOR BOLT ACTUATING MECHANISM

[75] Inventor: Gene Beijer, Sepulveda, Calif.

[73] Assignee: Adams Rite Products, Inc., Glendale, Calif.

[21] Appl. No.: 248,783

[22] Filed: Mar. 30, 1981

[51] Int. Cl.³ ............................ E05B 3/00; B64C 1/14
[52] U.S. Cl. .......................... 292/336.3; 292/DIG. 31
[58] Field of Search ...................... 292/36, 40, 48, 52, 292/336.3, DIG. 31; 244/129.5, 129.4

[56] References Cited

U.S. PATENT DOCUMENTS

| 2,104,838 | 1/1938 | Leonard | 292/DIG. 31 X |
| 2,143,127 | 1/1939 | Leonard | 292/DIG. 31 X |
| 2,234,651 | 3/1941 | Pick | 292/DIG. 31 X |
| 2,498,527 | 2/1950 | Castle | 292/40 |
| 2,721,750 | 10/1955 | Rudis et al. | 292/DIG. 31 X |
| 3,051,280 | 8/1962 | Bergman et al. | 244/129.5 X |
| 3,528,695 | 9/1970 | Peders | 292/336.3 |
| 4,199,120 | 4/1980 | Bergman et al. | 244/129.5 |
| 4,268,077 | 5/1981 | Bohleen et al. | 292/336.3 |

FOREIGN PATENT DOCUMENTS

| 613031 | 4/1935 | Fed. Rep. of Germany | 292/DIG. 31 |
| 836432 | 10/1938 | France | 292/DIG. 31 |
| 683445 | 11/1952 | United Kingdom | 292/336.3 |
| 219394 | 9/1968 | U.S.S.R. | 292/336.3 |

OTHER PUBLICATIONS

Drawing of "Latch Handle Cabin Door", by Adams Rite Products, Inc., Glndale Calif., #D 80477 2330, 1 p., 3/16/1964.

Primary Examiner—Thomas J. Holko
Attorney, Agent, or Firm—Whann & McManigal

[57] ABSTRACT

An aircraft door latching bolt actuating mechanism in which inside and outside handles are provided to actuate a crank having connections with one or more door latching bolts. The outside handle comprises a T-shaped handle with oppositely extending hand-grip portions for two hand actuation, and which are pivoted for swinging movement between a generally flush retracted position in which the hand-grip portions serve to releasably latch the crank against movement to a bolt releasing position, and an extended non-latching position permitting movement of the crank to the bolt releasing position. The hand-grip portions are interconnected with a common actuating and equalizing member that is supported for rotation with the inside and outside handles, and also for independent reciprocal movements in opposite directions. A spring normally urges the actuating member in a direction to move the hand-grip portions into their retracted positions, and a cam is arranged to move the actuating member in the opposite direction and extend the hand-grip portions of the outside handle, when rotated by the inside handle. A finger receiving opening in one of the end grip portions of the outside handle enables movement of the hand-grip portions to their extended released positions and thus permits actuation of the crank to bolt releasing positions by means of the outside handle.

16 Claims, 9 Drawing Figures

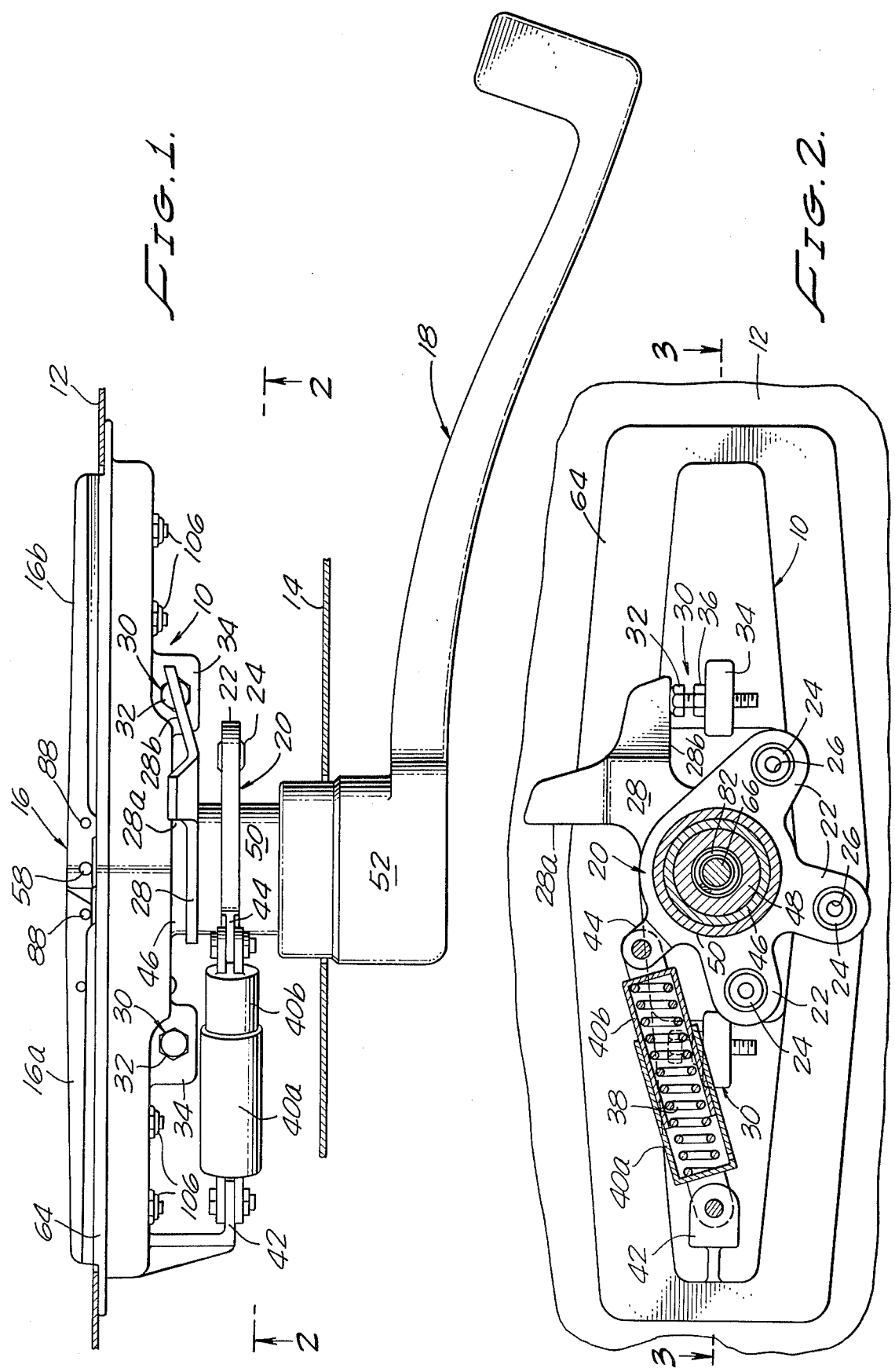

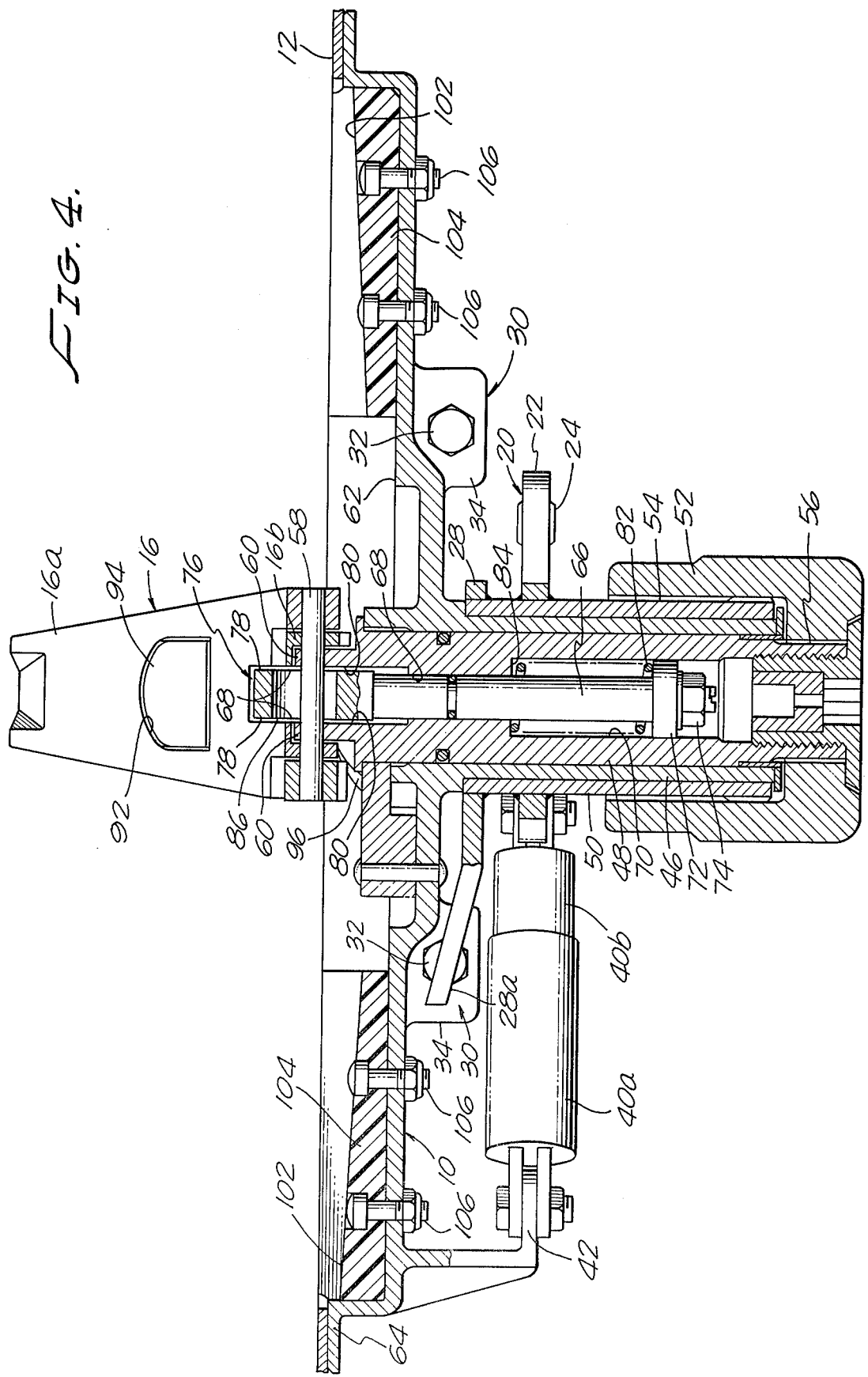

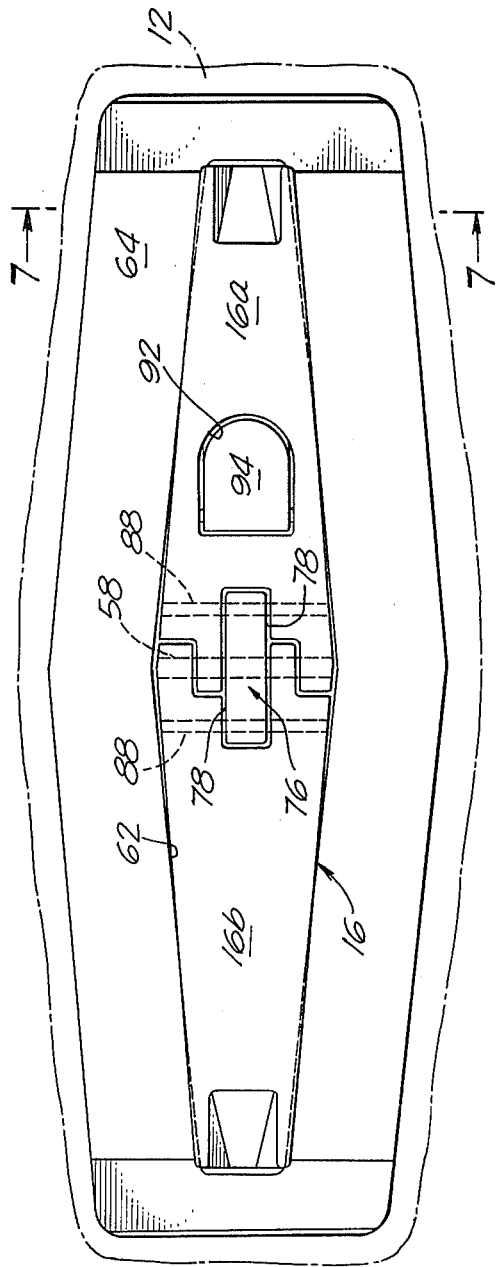
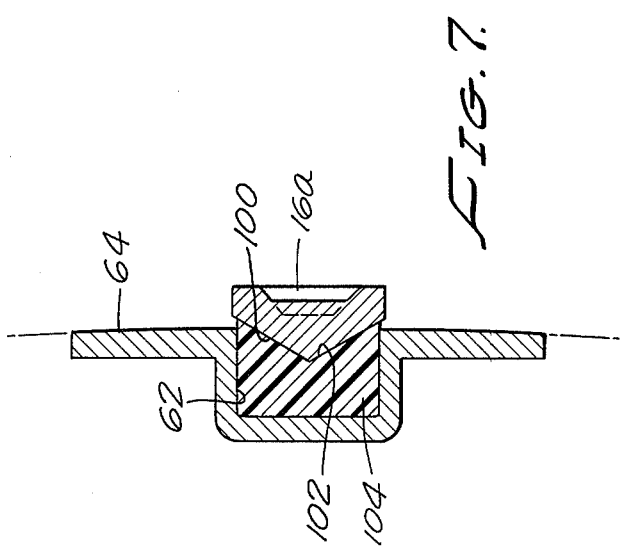
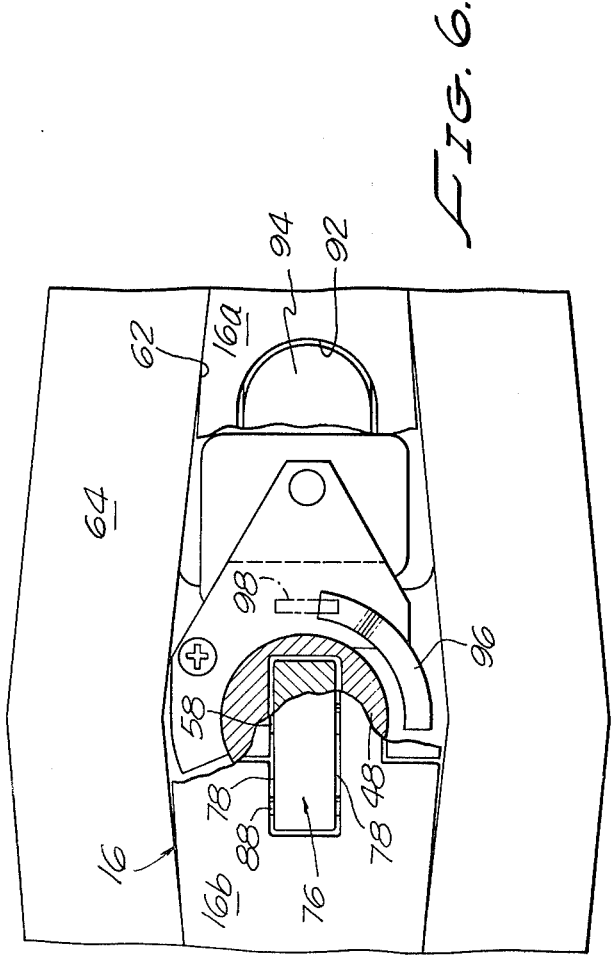

AIRCRAFT DOOR BOLT ACTUATING MECHANISM

BACKGROUND OF THE INVENTION

The present invention related generally to door locking bolt mechanisms, and manually operable means for the actuation of such bolts.

When such mechanisms are installed for utilization on aircraft doors, such as a cabin door mounted in the skin structure of the main passenger cabin, the mechanisms must comply with Federal Air Regulations 25 which have been interpreted as requiring a one motion inside handle to release the door bolt or bolts.

In one early prior know concept, it was proposed to provide an interconnected bolt actuating inside handle and an outside T-shaped handle normally having a flush mounted latching position, but which was arranged to pop out into a released position upon actuation of a trip release means associated with the inside operating handle. This arrangement was considered to be a two motion operation of the inside handle, and therefore did not conform with the commonly understood interpretation of the Federal Air Regulations.

Subsequently, another concept was conceived and developed to meet the Federal Air Regulations requirements, such concept being disclosed in the Adams Rite Manufacturing Co. Drawing No. 2330, and having been known publicly since 1964. Briefly, the disclosed structure provides a T-shaped inside handle which is secured to one end of a rotatably mounted main shaft in the door structure, this shaft being connected with an actuating crank that is operatively connected with the door bolts. An outside door handle comprises a single hand-grip lever that is pivoted at one end to the outer end of the main shaft for swinging movements between a retracted substantially flush seated position in a recess of an outside escutcheon plate so as to releasably latch the crank in a bolted position. A spring at the pivoted end of the handle normally urges the hand-grip lever into retracted position. Adjacent its pivoted end, the lever is provided with a roller which is adapted, upon rotation of the main shaft by the inside handle, to ride up an arcuate cam ramp and thus move the lever out of its latching recess as continued rotation of the main shaft moves the crank to a bolt unlocked position. The single outside hand-grip lever may also be utilized to actuate the crank and move it to a bolt unlocked position. For this operation, a finger may be inserted under the outer end of the lever, and by exerting a pulling force move the lever to a tilted unlatched extended position and then rotated to actuate the crank.

The present invention constitutes an improvement over the concept disclosed in the above noted drawing, and embodies a number of desirable features which contribute to the ease of operation and make the mechanism more dependable during long periods of operative use. Such features include:

A. Provision of an outside T-handle having oppositely extending hand-grip portions which enable the use of two hands for the application of greater and equilized operating torque forces.

B. The inclusion of a unique actuating and equalizing interconnection means between the outside hand-grip portions, whereby tilting movements of one of the hand-grip portions will result in a similar movement of the other hand-grip portion.

C. The provision of coacting seating V-surfaces at the outer ends of the hand-grip portions of the outside handle, which guide and assist in the movements of the hand-grip portions into and out of their retracted positions.

D. An improved over-center spring arrangement, for urging the bolt actuating crank towards limit positions corresponding to the bolted and unbolted positions of the door bolts.

E. An improved camming means for moving the pivoted hand-grip portions of the outer handle into tilted extended positions in response to rotation of the inner handle.

SUMMARY OF THE INVENTION

The herein described invention is more particularly concerned with an improved actuating handle mechanism for the actuation of the bolts on airplane doors, and in particular the main doors of the passesnger cabin.

It is one object of the herein described invention to provide an improved bolt actuating handle mechanism for an aircraft door in which one motion only of an inside actuating handle is required to move the door bolts to an unbolted position.

A further object is to provide an aircraft door bolt actuating mechanism according to the previous object, in which a unique camming means will operate in response to the rotation of an inner handle in a manner to move the oppositely extending hand-grip portions of an outer handle from a retracted latching position to an extended unlatched position.

Another object is to provide in an aircraft door bolt actuating mechanism, an improved outside actuating handle which embodies oppositely extending hand-grip portions susceptible of two hand operation, and in which the manual tilting of one of the hand-grip portions to an extended position will cause the other hand-grip portion to be similarly tilted.

Still another object resides in the provision of a bolt actuating mechanism for an aircraft door, wherein inside and outside operating handles are connected with a bolt actuating crank that is movable between operative positions as determined by limit stops, and in which an over-center spring is arranged to urge the crank towards said limits.

It is also an object to provide in a bolt actuating mechanism for an aircraft door, an improved outside actuating handle with oppositely extending hand-grip portions which are pivoted at their adjacent ends for tilting movements between a substantially flush retracted position within a receiving recess, and an extended position out of the recess, and in which the outer ends of the hand-grip portions have V-shaped seating surfaces engageable with companion V-shaped surfaces in the recess, when the hand-grip portions are in their retracted positions.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a top plan view of a bolt actuating mechanism embodying the features of the present invention, the mechanism being mounted between the inner and outer skin surfaces of the door;

FIG. 2 is a transverse sectional view, taken substantially on line 2—2 of FIG. 1, and having portions in section to disclose the over-center spring arrangement for urging the bolt actuating crank towards operative limit positions;

FIG. 4 is a similar view to that of FIG. 3, except that the hand-grip portions of the outer handle are disclosed in an extended position, and rotated 90° to show further details of the pivotal mounting of the hand-grip portions and the means for equalizing the movement of the two hand-grip portions;

FIG. 5 is a fragmentary elevational view of the hand-grip portions of the outside handle and its associated escutcheon frame structure, as seen from the outside in FIG. 1;

FIG. 6 is an enlarged fragmentary central portion of FIG. 5 with parts broken away to show details of the associated camming means;

FIG. 7 is a fragmentary transverse sectional view, taken substantially on line 7—7 of FIG. 5 to show the V-shaped seating surfaces at the outer ends of the hand-grip portions of the outer handle;

DESCRIPTION OF THE PREFERRED EMBODIMENT OF THE INVENTION

Figure 3:
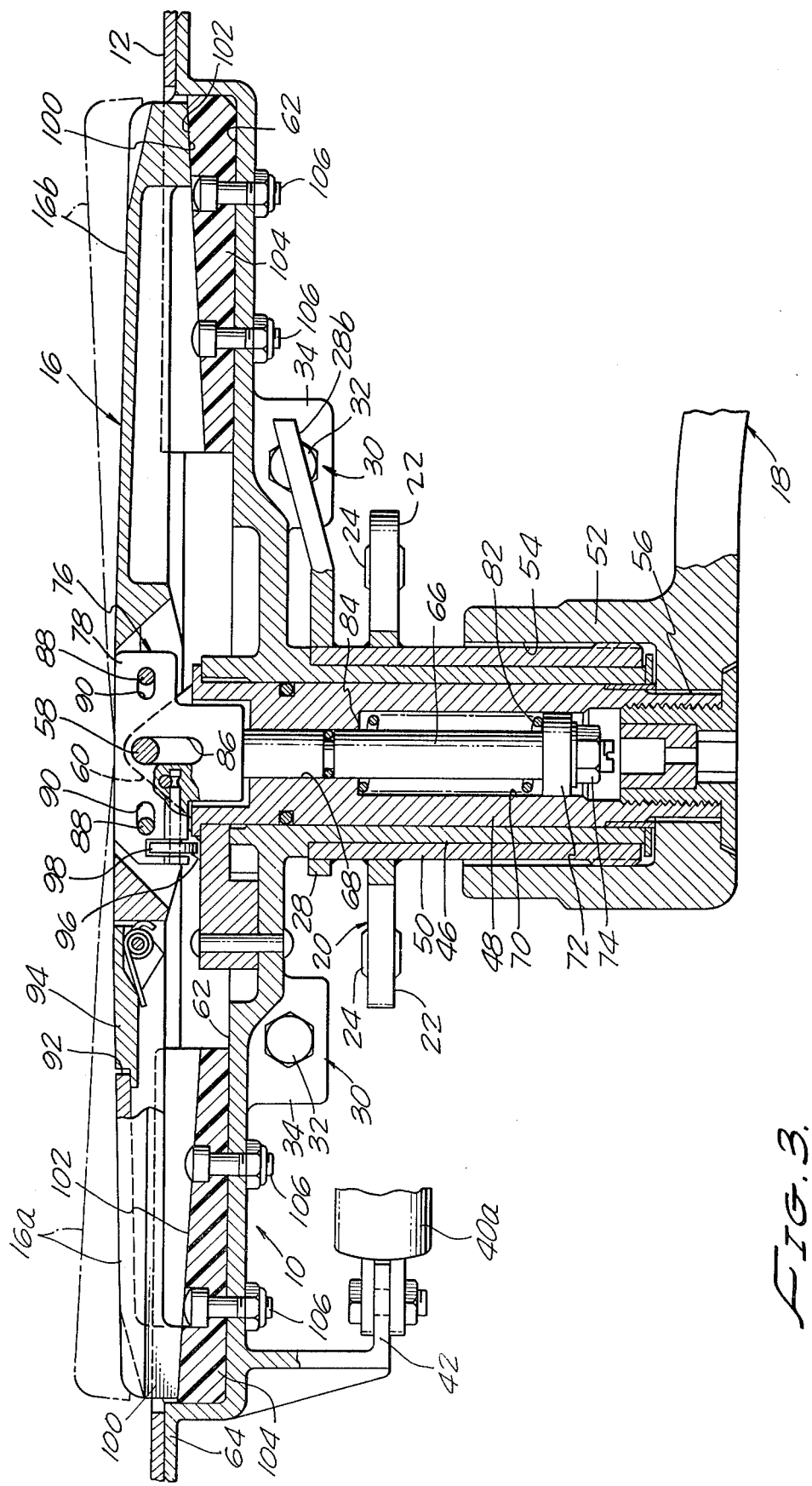
FIG. 3 is an enlarged fragmentary sectional view, taken substantially on line 3—3 of FIG. 2, and showing details of the operative connection between the inside and outside handles, and the equalizing means for interconnecting the tiltable hand-grip portions of a T-shaped outer handle structure, the hand-grip portions being in retracted position.
Figure 8:
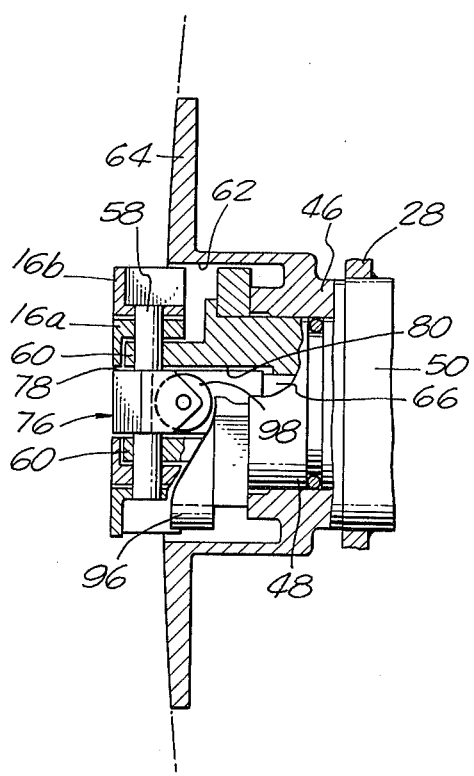
FIG. 8 is an enlarged fragmentary detailed sectional view to show details of the cam and follower elements in the retracted position of the hand-grip portions of the outer handle.

Referring more specifically to the drawings, for illustrative purposes, the invention is shown in FIG. 1 as generally comprising a frame structure, as generally indicated by the numeral 10, which is arranged to be mounted by conventional means between the outer skin 12 and inner skin 14 of an aircraft door, such as the main door of a passenger cabin. Characteristically, these doors are arranged to be secured in a closed position by means of one or more locking bolts (not shown). The bolt actuating mechanism of the present invention is directed to a manually operable handle arrangement which may be appropriately manipulated to lock and unlock the latching bolts of the door in a manner which will comply with the provisions of the Federal Air Regulations.

In its broad concept, the bolt actuating mechanism of this invention comprises an outside handle 16 and an inside handle 18 which are supported in the frame structure for unitary rotation in one direction to move the door bolts into a bolted position, and then in an opposite direction to move the door bolts into an unbolted position. The handles are operable to actuate a rotatably mounted multiarmed bell crank 20 which is shown in FIG. 2 as being provided with a plurality of radially extending arms 22, in this case three. The outer end of each arm 22 mounts a spherical bearing assembly 24 which contains an opening 26 for the connection of a suitable bolt actuating link (not shown).

The bell crank 20 is movable between operative stop limits which correspond to the bolted and unbolted positions of the door bolts. For determining the operative limit positions of the bell crank 20, a connected stop arm 28 is provided with angularly disposed fingers having abutment edges 28a and 28b, these edges being in 90° angular relation. As will be seen, these edges are arranged to engage adjustable limit determining stops, as generally indicated by the numeral 30. Each stop is shown as comprising a bolt 32 having threaded engagement with a frame lug 34. The bolt 32 may be secured in its adjusted stop position by means of a lock nut 36. The bell crank 20 is spring urged to its limit positions by means of a compression spring 38 that is housed within a pair of telescoped tubular housing members 40a and 40b that are respectively connected by end lugs to a frame anchor lug 42 and a crank lug 44.

As best shown in FIGS. 3 and 4, the frame structure 10 is fabricated to provide a fixed elongate sleeve bearing 46 which serves to rotatably support an internal main shaft 48. Externally, the sleeve bearing 46 rotatably supports a surrounding tubular shaft 50 to which the bell crank 20 is permanently affixed as by welding or other means. The main shaft 48 and tubular shaft 50 are interconnected for unitary rotation, and for this purpose, the innermost end of the inside handle 18 is formed with a generally cup-shaped attaching hub 52, this hub being secured to the tubular shaft 50 as by a splined connection 54, and to the main shaft 48 as by a splined connection 56.

Figure 9:
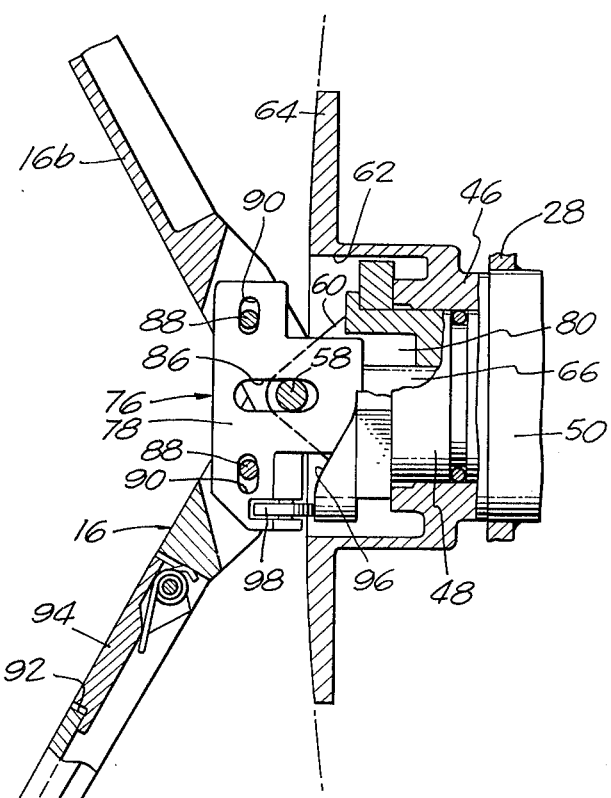
FIG. 9 is a view similar to FIG. 8, but with the handles rotated 90° into an extended position, as shown in FIG. 4.

An important feature of the present invention resides in the provision of an outside handle structure which permits the operator to utilize both hands, and thus equalize the application of torque forces for actuating the bolt or bolts of the door. As will be seen, the outside handle 16 is of a generally T-shaped configuration and comprises oppositely extending hand-grip portions 16a and 16b which are supported at their inner adjacent ends on a common main pivot pin 58 for tilting swinging movement between a retracted substantially flush position as shown in full lines in FIG. 3, and an extended position in which the hand-grip portions are in an outwardly diverging angular position as shown in FIG. 9. The main pivot 58, as shown in FIG. 4, is supported at the outer end of the main shaft 48 by a pair of spaced apart shaft end projections 60. As thus mounted, it will be apparent that rotation of the outside hand-grip portions will be transmitted to the main shaft 48.

Again referring to FIG. 3, it will be seen that the hand-grip portions 16a and 16b of the outside handle are adapted in their retracted position to occupy a seated position within a recessed cavity 62 of an escutcheon forming part 64 at the outer end of the elongate sleeve bearing 46. It will be observed that in the retracted position of the hand-grip portions 16a and 16b, these hand-grip portions cooperate with the recessed cavity 62 to releasably latch the bell crank 20 in its bolt latched position.

Another feature of this invention resides in the provision of a unique arrangement for equalizing the tilting movements of the hand-grip portions 16a and 16b in such a manner that tilting of one of the hand-grip portions will similarly operate to tilt the other hand-grip portion. For this purpose, and as best shown in FIGS. 3 and 4, an elongate equalizer shaft 66 which is mounted within an internal elongate axial bore of the main shaft 48. This bore is formed to provide a bore section 68 of reduced diameter at the outer end of the main shaft 48 which supports the shaft 66 for reciprocal movements. The innermost end of the shaft 66 extends into an enlarged diameter bore section 70 within which this end of the shaft is guidingly supported by means of an annular slide member 72 which is mountingly retained by a retaining nut 74.

The outermost end of the equalizer shaft 66 is formed with a generally T-shaped heat portion 76 having opposed flat side walls 78 which coact with the inner facing wall surfaces 80 of the shaft end projections 60 to oppose relative rotation between the main shaft 48 and the equalizer shaft 66, and yet permit relative reciprocable movements of the equalizer shaft. The equalizer shaft 66 is normally urged in an inward direction by means of a compression spring 82 in the bore portion 70, one end of this spring bearing against the slide member 72, and the other end bearing against a shoulder 84 at the adjacent end of the bore section 68.

The head portion 76 is formed with an elongate axially extending slot 86 in which the main pivot pin 58 is positioned. This slot permits axial movement of the equalizer shaft 66 and the connected head portion 76 during swinging movements of the hand-grip sections 16a and 16b. This head section is also connected with the hand-grip sections respectively through pivot pins 88 positioned on opposite sides of the main pivot pin 58, and which are moveable in transversely aligned slots 90 found in the head portion 76. As thus arranged, it will be apparent that, if one of the hand-grip portions is tiltingly moved, such movement will act through the slot and pin interconnections of the head portion 76 to cause similar movement of the other hand grip portion. Also, that as the hand-grip portions are moved to an extended position, such movement will tend to compress the spring 82 in such a manner that its spring forces will tend to return the hand-grip portions towards their normally seated retracted positions. In order to facilitate manual movement of the hand-grip portions 16a and 16b to their extended positions, when it is desired to utilize the outside handle to actuate the bolt crank 20, one of the hand-grip portions, in this case the hand-grip portion 16a, is provided with a finger receiving opening 92 through which a finger may be inserted in order to pull the hand-grip portion into an extended position. This finger receiving opening is normally closed by a spring urged closure member 94.

Another feature of the invention resides in the provision of means for moving the hand grip portions 16a and 16b from their retracted positions to extended positions in response to rotation of the inside handle 18. It will be noted that in the retracted position of the hand-grip portion 16a and 16b, these hand-grip portions act to releasably latch the main shaft 48 against rotation. Means are therefore necessary to unlatch the hand-grip portions in response to rotative movement of the main shaft, for example, by means of its rotation by the inner handle 18. For this purpose, camming means are provided which comprises an arcuate fixed camming ramp 96 on the frame structure 10 in surrounding relation to the adjacent outer end of the main shaft 48. Operatively associated with this ramp is a roller 98 which is carried by the head portion 76. The configuration of the ramp is such that as the shaft 48 begins its rotation, the head portion 76 will be moved outwardly against the force of spring 82, and during this movement the pivot pin 88 of each hand-grip portion will be swung in a direction to tiltingly swing the hand-grip portions out of their latching positions and clear of the frame structure so that the rotation of the shaft 48 may be continued in order to move the hand-grip portions to their fully extended positions and at the same time actuate the crank 20 to release the door bolts.

As shown in FIGS. 3 and 7, the undersides of the end portions of the hand-grip portions 16a and 16b are respectively provided with a V-shaped seating surface 100 in which outwardly converging side faces are adapted to engage with inwardly converging companion faces of a V-shaped seating surface 102 on a plastic insert block 104, this block being operatively secured within the end of the recessed cavity 62 as by retaining bolts 106. The wedging shape of these seating surfaces effectively contribute to the guiding movement of the hand-grip portions 16a and 16b into and out of their retracted seating positions. While in the illustrated disclosure, the camming ramp 96 has been shown as being formed as a part of a separate element which is mounted upon the frame structure 10, it is to be understood that the ramp, if desired, could be formed as an integral part of the frame structure 10.

It is believed that the operation of the actuating mechanism of the present invention will be clearly apparent from the foregoing description, that the outlined objects of the invention will be attained, and that the unique and cooperative arrangement of the respective elements will provide desirable operating advantages over the prior known structures.

Various modifications may suggest themselves to those skilled in the art without departing from the spirit of the disclosed invention, and, hence, it is not wished to be restricted to the specific forms shown or uses mentioned except to the extent indicated in the appended claims.

I claim:

1. An aircraft door bolt actuating mechanism, comprising:
   a bolt actuating crank having positions of rotation corresponding respectively to the bolted and unbolted positions of the door bolt;
   inside and outside door handles connected for unitary rotation and for rotating said crank;
   means for moving said outside handle between a generally flush retracted inactivated position and an extended activated position for manually operating said crank including:
   an actuating member operatively connected with said outside handle, said member being supported for unitary rotation with said handles and for reciprocable movement in one direction, to retract the outside handle and in a reverse direction to extend said outside handle;
   spring means for urging said member in said one direction; and
   means responsive to the rotation of said member for moving said member in said reverse direction.

2. Actuating mechanism according to claim 1, in angularly spaced stops respectively limit the rotation of said crank at said positions; and spring means movable through an over-center position urges said crank towards said stops.

3. Actuating mechanism according to claim 1, in which:
   the means for moving said actuating member in response to its rotation comprises camming means.

4. An aircraft door bolt actuating mechanism, comprising:

a frame structure adapted for mounting on said door;

a bolt actuating crank rotatably supported on said frame structure for movement to bolted and unbolted positions;

inside and outside door handles carried by said frame structure connected for unitary rotation and for rotating said crank; and said outside handle having a T-shaped configuration and comprising a pair of oppositely extending hand-grip portions having their adjacent ends pivoted on a common pivot and connected by by interconnecting means for unitary swinging movements between a retracted axially aligned position and an extended position with the hand-grip portions in angular outwardly diverging relation.

5. Actuating mechanism according to claim 4, in which:

said frame structure is formed to provide a fixed elongate sleeve bearing;

a main shaft is rotatably supported within said sleeve bearing and provides a support at one end for the pivoted ends of said hand-grip portions of the outside handle;

a tubular external shaft surrounds said bearing sleeve and is rotatably supported thereon, said tubular shaft having said crank mounted thereon; and said inside handle is secured to the other end of said main shaft and an adjacent end of said tubular shaft to provide unitary rotation of said shafts.

6. Actuating mechanism according to claim 4, in which the interconnecting means for said pivoted ends comprises:

an elongate member supported within an axial bore of said main shaft for relative axial reciprocal movements, but being restrained against independent rotation therein;

means respectively pivotally connecting one end of said elongate member with each said hand-grip portions at points adjacent said common pivot, whereby upon movement of said hand-grip portions from a retracted position to an extended position the elongate member will be moved axially in one direction; and a compression spring positioned within said axial bore of the main shaft, urges said elongate member in a direction opposite said one direction.

7. Actuating mechanism according to claim 6, in which:

said one end of said elongate member is formed to provide a head portion that is positioned between and retained against rotation by adjacent wall portions of said axial bore of the main shaft;

said head portion being formed with an elongate axial slot for the relatively movable reception of said common pivot therein; and transversely extending slots on said head portion positioned in alignment on opposite sides of said axial slot for the reception and movement therein of pivot pins respectively mounted on said hand-grip portions adjacent said common pivot.

8. Actuating mechanism according to claim 6, in which:

camming means are responsive to rotation of said main shaft and the connected hand-grip portions to move said elongate member in said one direction and thereby extend said hand-grip portions.

9. Actuating mechanism according to claim 8, in which said camming means comprises:

a fixed arcuate camming ramp mounted on said frame structure; and a cam follower member connected with said elongate member.

10. Actuating mechanism according to claim 4, in which:

said frame structure is formed to provide an outside escutcheon having a recessed cavity for the reception of said hand-grip portions in their retracted position, and in which position the hand-grip portions releasably latch the handles against rotation.

11. Actuating mechanism according to claim 10, in which:

means respectively at the outer ends of said hand-grip portions provides a V-shaped seating surface for engagement with a companion V-shaped surface in said recessed cavity, when said hand-grip portions are in said retracted position.

12. An aircraft door bolt actuating mechanism, comprising:

a bolt actuating crank having positions of rotation corresponding respectively to the bolted and unbolted positions of the door bolt:

inside and outside door handles connected for unitary rotation and for rotating said crank, said outside door handle being pivoted at one end for swinging movements between a generally flush retracted inactivated position and an extended activated position for manually operating said crank;

means for moving said outside handle, including:

an actuating member operatively connected with the pivoted end of said outside handle, said member being supported for unitary rotation with said handles and for reciprocable movement in one direction to retract the outside handle, and in a reverse direction to extend said outside handle;

spring means for urging said member in said one direction; and means responsive to the rotation of said member for moving said member in said reverse direction.

13. Actuating mechanism according to claim 12, in which:

the connection between the actuating member and the handle comprises a pin and slot connection.

14. Actuating mechanism according to claim 12, in which:

an escutcheon frame member has a recessed cavity for the reception of the outside door handle in its retracted position; and means at the outer end of said outside door handle provides a V-shaped seating surface for engagement with a companion V-shaped surface, when the handle is in said retracted position.

15. Actuating mechanism according to claim 12, in which:

the outside door handle has a finger receiving opening in an outer surface, whereby the handle may be manually pivotally swung to its extended position and rotated to actuate said crank.

16. Actuating mechanism according to claim 15, in which:

a spring urged closure normally closes said finger receiving opening.

* * * * *